United States Patent
Cai et al.

(10) Patent No.: US 7,957,756 B2
(45) Date of Patent: Jun. 7, 2011

(54) METHOD AND APPARATUS FOR FLOOR CONTROL IN MULTI-MEDIA PUSH-TO-TALK NETWORK

(75) Inventors: Zheng Cai, Fairfax, VA (US); Arun Manroa, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 567 days.

(21) Appl. No.: 12/036,826

(22) Filed: Feb. 25, 2008

(65) Prior Publication Data

US 2009/0215409 A1    Aug. 27, 2009

(51) Int. Cl.
*H04Q 7/20* (2006.01)

(52) U.S. Cl. ........ 455/518; 455/519; 455/500; 455/517; 455/414.1; 455/426.1; 370/259; 370/260; 370/261; 370/265; 370/310

(58) Field of Classification Search .................. 455/518, 455/519, 500, 517, 466, 414.1–414.4, 550.1, 455/557, 564, 566; 370/359, 260, 261, 265, 370/310, 312, 328, 329, 343

See application file for complete search history.

(56) References Cited

U.S. PATENT DOCUMENTS

| | | | |
|---|---|---|---|
| 5,263,181 A * | 11/1993 | Reed ........................... | 455/152.1 |
| 2005/0124365 A1 | 6/2005 | Balasuriya et al. | |
| 2007/0015532 A1* | 1/2007 | Deelman .................... | 455/550.1 |
| 2007/0021133 A1 | 1/2007 | Coulas | |
| 2007/0243835 A1* | 10/2007 | Zhu et al. ..................... | 455/90.2 |
| 2008/0139247 A1* | 6/2008 | Zhang ........................... | 455/557 |
| 2008/0320083 A1 | 12/2008 | Albertsson et al. | |
| 2009/0033521 A1* | 2/2009 | Ladouceur et al. ............. | 341/22 |

OTHER PUBLICATIONS

Pending Patent Application, titled "Method and Apparatus for Floor Control in Multi-Media Push-to-Talk Network", Inventors CAI, et al., filed Feb. 25, 2008.

* cited by examiner

*Primary Examiner* — Keith T Ferguson

(57) ABSTRACT

An apparatus and method for floor control in a multi-media push-to-talk network is disclosed. A device for communication in the multi-media network includes a floor request sensor. The floor request sensor includes a first sensor and a second sensor. The method includes sending a floor grant request message for a first media type in a multi-media dispatch communication session and a floor request message for a second media type in the multi-media dispatch communication session by a floor request sensor of a communications device to a dispatch network controller.

18 Claims, 4 Drawing Sheets

ENHANCED PTT BUTTON

| SENSOR | FLOOR REQUEST MESSAGE |
|---|---|
| 320 — UPPER SENSOR (BUTTON) | REQUEST MEDIA TYPE VOICE FOR SELF |
| 330 — MIDDLE SENSOR (BUTTON) | REQUEST BOTH MEDIA TYPES (VOICE + VIDEO) FOR SELF |
| 340 — LOWER SENSOR (BUTTON) | REQUEST MEDIA TYPE VIDEO FOR SELF |

*FIG. 4*

| SENSOR | FLOOR REQUEST MESSAGE |
|---|---|
| 320 — UPPER SENSOR (BUTTON) | REQUEST MEDIA TYPE VOICE FOR SELF; GRANT MEDIA TYPE VIDEO TO OTHER PARTY (PARTIES) |
| 330 — MIDDLE SENSOR (BUTTON) | REQUEST BOTH MEDIA TYPES (VOICE + VIDEO) FOR SELF |
| 340 — LOWER SENSOR (BUTTON) | REQUEST MEDIA TYPE VIDEO FOR SELF; GRANT MEDIA TYPE VOICE TO OTHER PARTY (PARTIES) |

*FIG. 5*

METHOD AND APPARATUS FOR FLOOR CONTROL IN MULTI-MEDIA PUSH-TO-TALK NETWORK

FIELD OF THE INVENTION

The present invention relates generally to the field of telecommunications, and in particular to multi-media push-to-talk wireless communications networks.

BACKGROUND OF THE INVENTION

Today, push-to-talk (PTT) communication networks primarily support voice communications. However, as the use of multi-media communications and information increases, e.g., video, gaming, etc., it is desirable to incorporate these additional forms of communications and information into PTT networks. These networks may be referred to as push-to-X networks.

Currently, floor control processes, and the hardware for implementing these processes, in PTT networks and PTT enabled devices are directed to supporting voice communications. However, with these additional forms of communications and information becoming available over the wireless networks, and in order to efficiently utilize these additional forms of communications and information, known floor control processes and apparatuses have deficiencies.

Therefore, there is a need for an improved method and apparatus for floor control in a multi-media push-to-talk communications network.

SUMMARY OF THE INVENTION

In accordance with an embodiment of an apparatus of the present invention, a device for communication in a multi-media dispatch network includes a floor request sensor. The floor request sensor includes a first sensor and a second sensor.

In accordance with an embodiment of a method of the present invention, the method includes sending a floor grant request message for a first media type in a multi-media dispatch communication session and a floor request message for a second media type in the multi-media dispatch communication session by a floor request sensor of a communications device to a dispatch network controller.

BRIEF DESCRIPTION OF THE DRAWINGS

FIG. 4 illustrates an embodiment of types of floor control messages that are associated with the sensors of the enhanced PTT button of the mobile communications device of FIG. 3.

FIG. 5 illustrates an alternative embodiment of types of floor control messages that are associated with the sensors of the enhanced PTT button of the mobile communications device of FIG. 3.

DETAILED DESCRIPTION OF THE EXEMPLARY EMBODIMENTS

Figure 1:
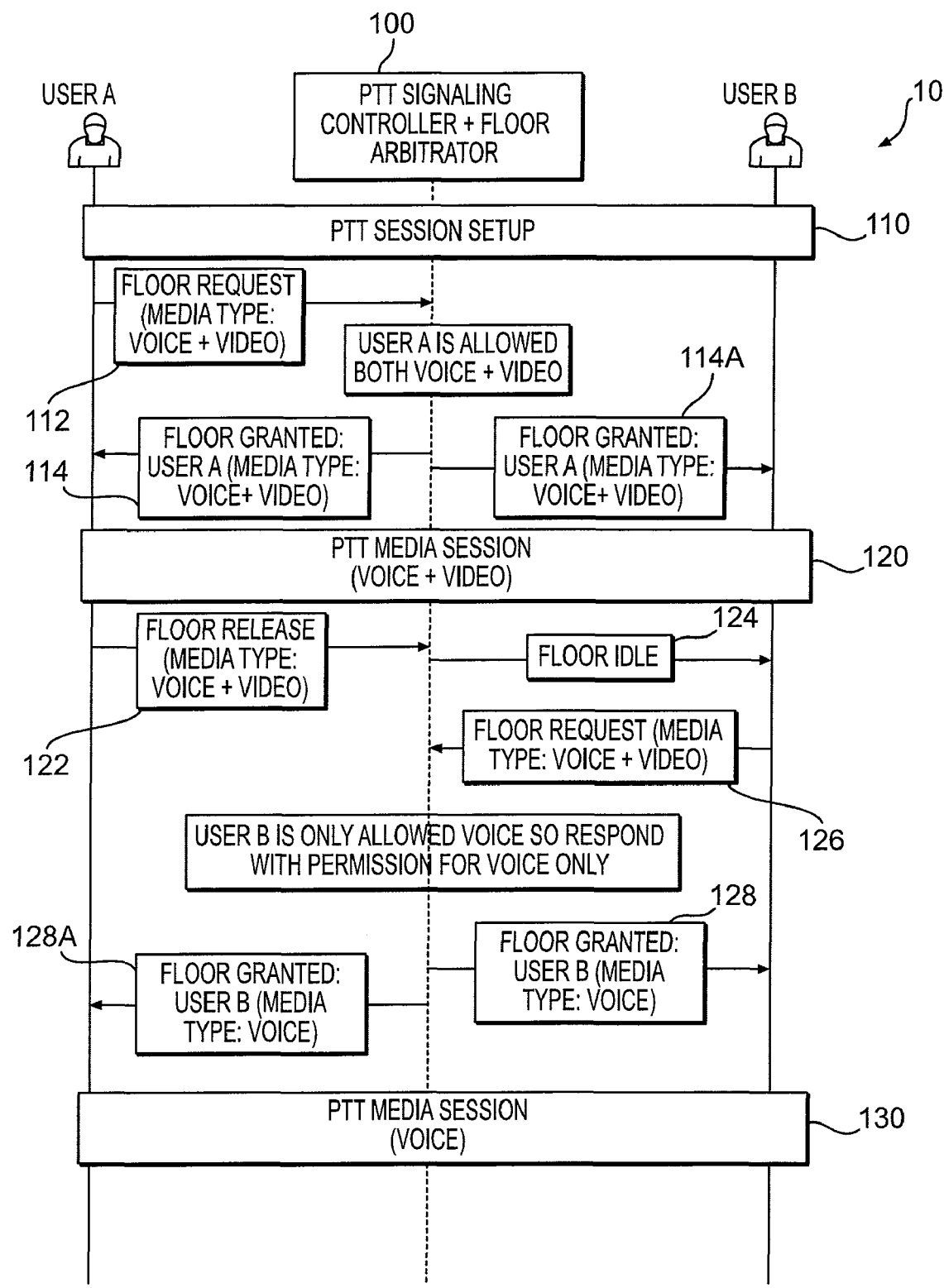
FIG. 1 illustrates an embodiment of a method and apparatus in accordance with the principles of the present invention for floor control in a multi-media push-to-talk network in accordance with the principles of the present invention.

FIG. 1 illustrates an embodiment of a method and apparatus in accordance with the principles of the present invention for floor control in a multi-media push-to-talk network in accordance with the principles of the present invention. As can be seen, a message flow diagram 10 is provided for establishing a multi-media communication session between a first user A and a second user B by a PTT signaling controller and floor arbitrator 100 (hereinafter "PTT controller"). Whereas the illustrated multi-media communication session includes voice and video media, the present invention is not limited to only these two types of media. The present invention may be practiced with any of a variety of media types, including voice, video, gaming, data, etc.

In this embodiment, in the PTT session setup 110, user A sends a floor request message 112 that requests the floor in the multi-media communication session for both media types, i.e., voice and video, for use by user A. The floor request message 112 is received at the PTT controller 100. As is known, PTT systems by nature and design allow only one participant to gain the floor. The person who has the floor then has the ability to send a communication to other participants in the communication session. The other participants must wait for the floor to be released before they can then request the floor. This type of communication system is a dispatch system, also known as a half-duplex system, where only one person at a time can send a communication to other participants. Thus, in step 112, user A is requesting the floor in the multi-media communication session for both voice and video communications for user A's own use.

In response to the floor request message 112, PTT controller 100 grants the floor to user A for both media types in the multi-media communication session, i.e., voice and video. PTT controller 100 may determine whether to grant the floor based on any of a variety of parameters, however, the present invention is not limited to any particular decision process by the PTT controller 100 for determining whether any particular floor request should be granted. In granting the floor to user A in response to the floor request message 112, PTT controller 100 sends a floor grant message 114 to user A and a floor taken message 114A to user B. Floor grant message 114 notifies user A of the floor grant and enables user A's communication device to send both voice and video communications to other participants, e.g., user B, in the multi-media communication session. Floor taken message 114A notifies user B of the grant of the floor to user A for both voice and video.

After the floor is granted to user A for both voice and video, voice and video communications may occur in the PTT multi-media session 120. In the session, if user A no longer requires the floor, user A sends a floor release message 122 to the PTT controller 100 that releases the floor for use by other participants in the session. The floor release message 122 releases the floor for both voice and video communications, which was previously granted to user A as discussed above. In response to receiving the floor release message 122, the PTT controller 100 sends a floor idle message 124 to user B, and any other participants. This message notifies the other users that the floor is now open and that it may be requested by the other users. With the floor now open, as illustrated, user B sends a floor request message 126 to PTT controller 100 to request the floor for both voice and video communications.

As illustrated, in this exemplary message flow diagram, PTT controller 100 only grants the floor to user B for voice communications in response to floor request message 126, which requested the floor for both voice and video communications for user B. Again, as discussed above, PTT controller 100 may determine whether to grant the floor in response to a request based on any of a variety of parameters. This exemplary message flow diagram, where the PTT controller granted the floor to user A for both requested media types and only granted the floor to user B for one of the two requested media types, should not be construed as a limitation in any way on the capabilities of the communications devices of user A or user B, or the PTT controller 100. This flow diagram is provided as an exemplary call flow for a multi-media communication session between participants and how the various media types in the multi-media session can be independently controlled within the session.

Therefore, in this exemplary message flow diagram, where PTT controller 100 only grants the floor to user B for voice communications in response to a request by user B for the floor for both voice and video communications, the floor for video communications can be requested by any other participant in the session since the floor is idle with respect to video communications. Thus, the different types of communications in the multi-media session can be jointly and independently requested, controlled, and granted in the session.

Continuing with the exemplary message flow diagram 10 of FIG. 1, in granting the floor to user B for voice communications in response to the floor request message 126, PTT controller 100 sends a floor grant message 128 to user B and a floor taken message 128A to user A. In the same manner as discussed above, floor grant message 128 notifies user B of the floor grant and enables user B's communication device to send voice communications to other participants, e.g., user A, in the communication session. Floor taken message 128A notifies user A of the grant of the floor to user B for voice. After the floor is granted to user B for voice communications, voice communications may occur in the PTT media session 130. As was also discussed above, in the session, if user B no longer requires the floor, user B sends a floor release message to the PTT controller 100 that releases the floor for voice for use by other participants in the session. The PTT controller 100 then sends a floor idle message to the other participants regarding the floor for voice communications.

Figure 2:
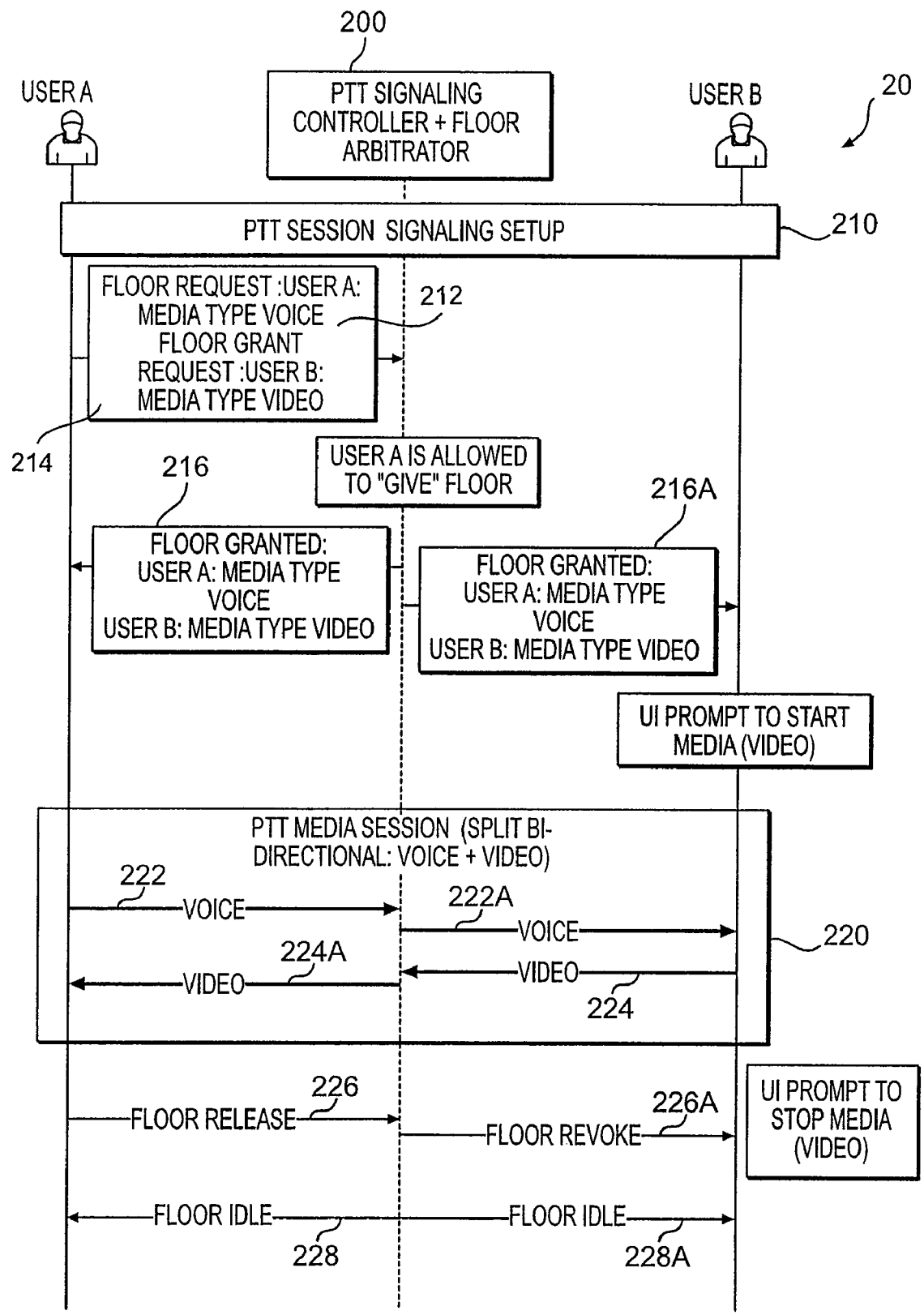
FIG. 2 illustrates an alternative embodiment of a method and apparatus in accordance with the principles of the present invention for floor control in a multi-media push-to-talk network in accordance with the principles of the present invention.

FIG. 2 illustrates an alternative embodiment of a method and apparatus in accordance with the principles of the present invention for floor control in a multi-media push-to-talk network in accordance with the principles of the present invention. As can be seen, a message flow diagram 20 is provided for establishing a multi-media communication session between the first user A and the second user B by the PTT controller 200. Again, whereas this illustrated multi-media communication session also includes voice and video media, the present invention is not limited to only these two types of media.

In this embodiment, in the PTT session setup 210, user A sends a floor request message 212 that contains a floor request for voice communications in the multi-media communication session for use by user A. User A also sends a floor grant request message 214 that contains a floor request for video communications in the multi-media communication session for use by a user other than user A, e.g., user B. Thus, in this embodiment, a single user, e.g., user A, is able to request the floor for one media type, e.g., voice, for its use and also to request that the floor be granted for another media type, e.g., video, for use by another participant. In this embodiment, a user is able to simultaneously request the floor for one media type for its use and request that the floor be granted to another participant for another media type for use by that other user.

This feature has particular utility where each of multiple participants in a multi-media communication session may only require the floor for one of the different media types in the multi-media session. A single participant may both request the floor for the media type that it requires and request that the floor be granted for the media type required by the other participant. This provides for greater efficiency in the call set-up process for a multi-media communication session. An example of a multi-media communication session where each of two participants may only require the floor for one of the different media types in the multi-media session is where user B is using the mobile communications device to send to user A a video of a construction site, real estate property, objects in a shop, etc. User B only requires the floor for video. However, user A, who is receiving the video from user B, may need to use its mobile communications device for a voice communication to user B in order to direct the camera movements of user B such that the desired video is received by user A. Thus, user A only requires the floor for voice.

Therefore, in accordance with the principles of the present invention, the floor for each of the different media types in the multi-media communication session may be granted to different participants. Further, any one of the participants may both request the floor for one media type for its use and grant the floor for another media type to another of the participants. Whereas the actual "grant" of the floor may be performed by the PTT controller, as discussed above, the PTT controller may be programmed in any of a variety of ways such that a received grant request is automatically approved if the respective floor is idle, such that, in effect, a user is granting the floor to another user by making the grant request.

Continuing with the discussion of this embodiment of the invention in FIG. 2, as can be seen, both the floor request message 212 and the floor grant request message 214 are received at the PTT controller 200. In response to messages 212 and 214, PTT controller 200 grants the floor to user A for voice and grants the floor to user B for video. In granting the respective floors to users A and B in response to user A's floor request message 212 and floor grant request message 214, PTT controller 200 sends floor grant messages 216 and 216A to users A and B, respectively. Floor grant message 216 notifies user A of the floor grant for voice to user A and the floor grant for video to user B and enables user A's communication device to send voice communications to other participants, e.g., user B, in the multi-media communication session. Likewise, floor grant message 216A notifies user B of the floor grant for voice to user A and the floor grant for video to user B and enables user B's communication device to send video communications to other participants, e.g., user A, in the multi-media communication session. Since user B may not be aware that the floor has been granted to it, since the grant was initiated by user A, in accordance with the principles of the present invention, the PTT controller may send a prompt to user B to notify user B of the granting of the floor for the respective media type. The prompt may be received by user B's communications device and displayed on a user interface of the device.

In an alternative embodiment, instead of sending a single message 216A to user B, two messages may be sent to user B. A first message may indicate that the floor has been taken by user A for the voice media type and a second message, called an unsolicited floor grant, may indicate that the floor has been granted to user B for the video media type. This may be desirable because the first message is within general interface definitions of a PTT network, e.g., floor taken message 114A of FIG. 1, and the second message is an extension message that alerts user B of an unsolicited grant of the floor for the respective media type. Thus, this extension message does not violate what may be a general interface rule of not sending a floor "grant" message to someone who did not request the floor.

After the respective floors are granted to users A and B, user A may send a voice communication 222 to PTT controller 200, which in-turn sends the voice communication, as illustrated by message flow 222A, to user B in the split bidirectional voice and video PTT multi-media session 220. Similarly, user B may send a video communication 224 to PTT controller 200, which in-turn sends the video communication, as illustrated by message flow 224A, to user A.

In the session, if user A no longer requires the floor, user A sends a floor release message 226 to the PTT controller 200 that releases the floor for voice for use by other participants in the session. In this embodiment, when the PTT controller receives the floor release message 226 related to voice communications, not only does the PTT controller release the floor for voice, but additionally, responsive to this floor release message 226, the PTT controller sends a floor revoke message 226A to user B which revokes the floor for video communications from user B. Thus, user B no longer has the floor for video. As discussed above, since user B may not be aware that the floor has been revoked from it, since the revocation was initiated by user A's floor release for voice, the PTT controller may send a prompt to user B to notify user B of the revocation of the floor for video communications, and thus prompt user B to stop video communications. This prompt may also be received by user B's communications device and displayed on the user interface of the device. Alternatively, a separate prompt from the PTT controller is not required. User B's communications device, in response to the floor revoke message 226A will notify the user interface which in-turn will notify user B and, possibly additionally, the media source to stop the streaming, e.g., in this case the video camera. A similar process can also be used for the UI prompt to start the video session, as discussed above.

This feature of the invention, where a single participant may both release the floor for its media type and revoke the floor for the media type of another participant, which was requested during the floor request, may additionally provide for greater efficiency in the call tear-down process for a multi-media communication session. It may be likely that in such a multi-media communication session, if one participant no longer requires the floor for one media type, then another participant(s) will no longer require the floor for the other media types(s), and thus, allowing a single user to control the release of the floors for the multiple media types will provide for greater efficiency in the communications system. After the respective floors have been released and revoked, PTT controller 200 sends floor idle messages 228 and 228A to user A and B, respectively. As discussed above, these messages notify the users that the floor is now open and that it may be requested by the other users.

Figure 3:
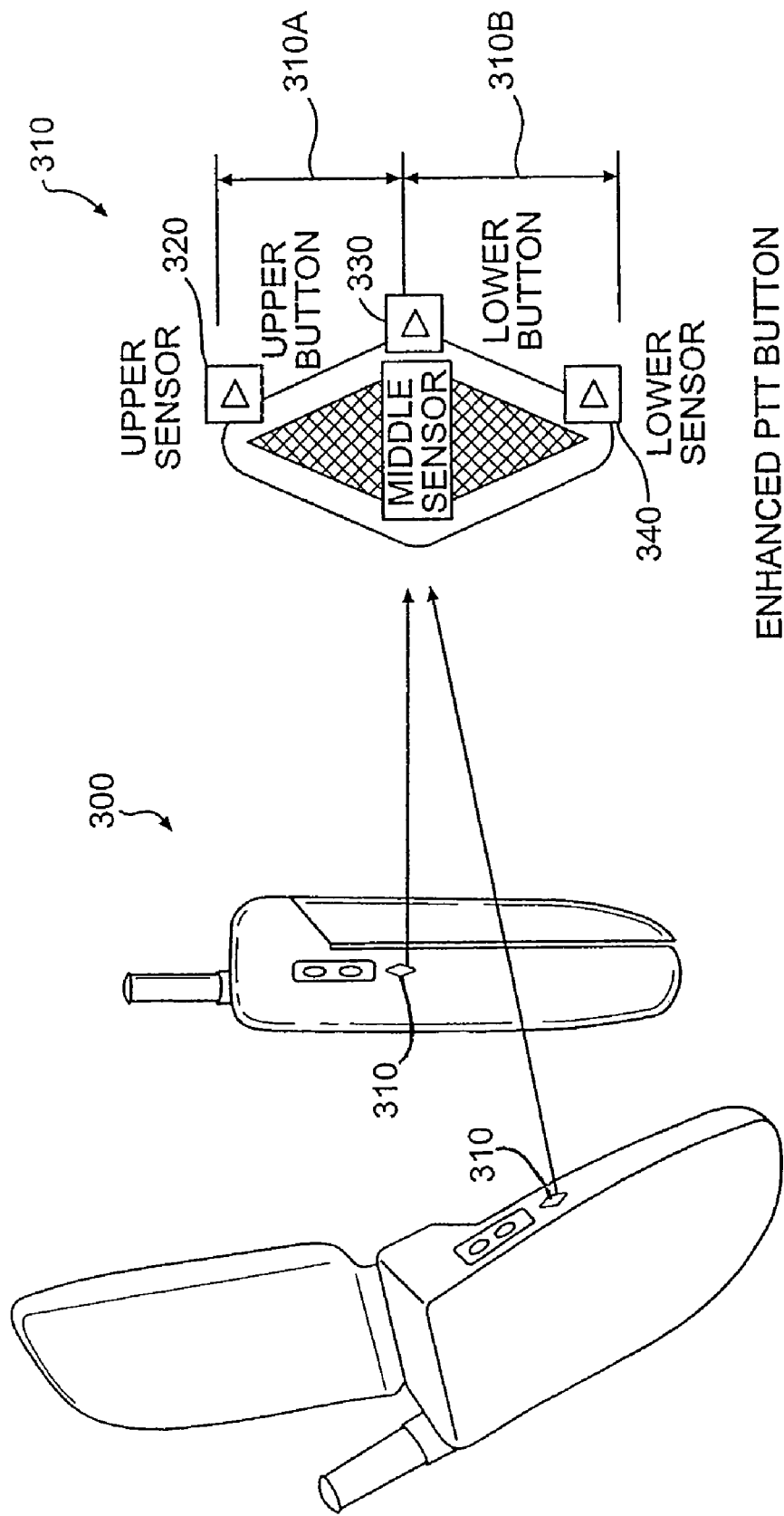
FIG. 3 illustrates an embodiment of a mobile communications device in accordance with the principles of the present invention.

In further implementing the request messages for the multi-media communication session of the present invention discussed above, as illustrated in an embodiment in FIG. 3, the present invention also provides a communications device with an enhanced PTT button. As can be seen, communications device 300 includes an enhanced PTT button 310. The PTT button 310 includes an upper sensor 320, a middle sensor 330, and a lower sensor 340. Thus, the PTT button 310 contains three different touch-sensitive areas that are disposed across an upper button area 310A and a lower button area 310B, which are capable of implementing the request messages discussed above. Thus, with the enhanced PTT button 310 of the present invention, a button is provided that can implement multiple variations of a floor request message in a multi-media communication session. Thus, with the present invention, a single button does not provide a single function.

The present invention is not limited to any particular embodiment for how the button is configured to implement the various request messages. For example, the button 310 can include separate physical buttons for each of the sensors or can include a touch-sensitive pad where different geometric areas of the pad are each associated with a respective possible floor request message. Additionally, the various sensors may be hard-wired to perform specified functions or may be configured by software such that any particular sensor may be programmed to perform any particular function.

FIGS. 4 and 5 provide illustrations of the various types of floor control messages that may be individually implemented by the multiple sensors of the enhanced PTT button of the present invention.

The floor control messages of FIG. 4 generally correspond to the message flow diagram 10 that is provided in FIG. 1 for establishing a multi-media communication session between the first user A and the second user B. In the flow diagram of FIG. 1, users A and B request the floor for their own use. Thus, in accordance with the principles of the present invention, a user is able to request the floor for either one media type for its own use, e.g., voice or video, and/or request the floor for both media types, e.g., voice and video, for its own use. In this embodiment of a multi-media communication session, the multiple sensors of the enhanced PTT button could be configured as shown in FIG. 4. Thus, the upper sensor 320 could be utilized to send a floor request message to the PTT controller where the user requests the floor for only the voice media type in the multi-media communication session. The middle sensor 330 could be utilized if the user desired to send a floor request message to the PTT controller where the user requests the floor for both the voice and video media types in the multi-media communication session. Lastly, the lower sensor 340 could be utilized if the user desired to send a floor request message to the PTT controller where the user requests the floor for only the video media type in the multi-media communication session. Thus, in accordance with the principles of the present invention, a single button can be utilized to send various floor request messages in a multi-media communication session.

The floor control messages of FIG. 5 generally correspond to the message flow diagram 20 that is provided in FIG. 2 for establishing a multi-media communication session between the first user A and the second user B. In the flow diagram of FIG. 2, user A can request the floor for one media type, e.g., voice or video, for its own use and grant the floor for another media type for another participant's use. In this embodiment of a multi-media communication session, the multiple sensors of the enhanced PTT button could be configured as shown in FIG. 5. Thus, the upper sensor 320 could be utilized to send a floor request message to the PTT controller where the user requests the floor for the voice media type in the multi-media communication session for its own use and grants the floor for the video media type to another party(s). The middle sensor 330 could be utilized if the user desired to send a floor request message to the PTT controller where the user requests the floor for both the voice and video media types in the multi-media communication session, as discussed above with respect to the embodiment of FIG. 4. Lastly, the lower sensor 340 could be utilized if the user desired to send a floor request message to the PTT controller where the user requests the floor for the video media type in the multi-media communication session for its own use and grants the floor for the voice media type to another party(s).

Thus, again, in accordance with the principles of the present invention, a single button can be utilized to send various floor request messages in a multi-media communication session.

Whereas the disclosed embodiments principally describes a private PTT call between two users A and B, the principles of the present invention can also be applied to group calls where one party is able to request the floor for one media type for himself/herself and request that the floor be granted to another member, or members, of the group call for another media type(s).

The disclosed embodiments are illustrative of the various ways in which the present invention may be practiced. Other embodiments can be implemented by those skilled in the art without departing from the spirit and scope of the present invention.

What is claimed is:

1. A device for communication in a multi-media dispatch network, comprising:
   a communications device, wherein the communications device includes a floor request sensor and wherein the floor request sensor includes:
   a first sensor; and
   a second sensor;
   wherein the first sensor is associated with a floor grant request message related to a first media type in the multi-media dispatch network and a floor request message related to a second media type in the multi-media dispatch network;
   and wherein the second sensor is associated with a floor request message related to both the first and second media types in the multi-media dispatch network.

2. The device according to claim 1:
   wherein the first media type is a voice communication and the second media type is video.

3. The device according to claim 1, wherein the floor grant request message related to the first media type requests that a floor be granted to a second communications device for the first media type.

4. The device according to claim 1, wherein the floor request message related to the second media type requests that a floor be granted to the communications device for the second media type.

5. The device according to claim 1, wherein the floor request sensor is a touch-sensitive pad and wherein the first sensor is an upper portion of the touch-sensitive pad and the second sensor is a lower portion of the touch-sensitive pad.

6. The device according to claim 1, wherein the first sensor is a first physical button and wherein the second sensor is a second physical button.

7. The device according to claim 1, wherein the floor request sensor includes a third sensor and wherein the third sensor is associated with a floor grant request message related to the second media type in the multi-media dispatch network and a floor request message related to the first media type in the multi-media dispatch network.

8. The device according to claim 7, wherein a functionality of the first sensor, the second sensor, and the third sensor is programmable by software.

9. A method for floor control in a multi-media dispatch communication session, comprising the steps of:
   sending a floor grant request message for a first media type in the multi-media dispatch communication session and a floor request message for a second media type in the multi-media dispatch communication session by a floor request sensor of a communications device to a dispatch network controller.

10. The method according to claim 9, further comprising the steps of:
    granting a floor to a second communications device for the first media type in response to the floor grant request message by the dispatch network controller; and
    granting a floor to the communications device for the second media type in response to the floor request message by the dispatch network controller.

11. The method according to claim 10, wherein the first media type is a voice communication and further comprising the step of receiving a voice communication from the second communications device at the dispatch network controller for forwarding to the communications device.

12. The method according to claim 10, wherein the second media type is video and further comprising the step of receiving a video from the communications device at the dispatch network controller for forwarding to the second communications device.

13. The method according to claim 10, further comprising the step of sending a prompt to the second communications device by the dispatch network controller to notify the second communications device of the granting of the floor to the second communications device for the first media type.

14. The method according to claim 13, further comprising the step of displaying the prompt on a user interface of the second communications device.

15. The method according to claim 9, wherein the first media type is a voice communication.

16. The method according to claim 9, wherein the second media type is video.

17. The method according to claim 9, further comprising the step of programming a functionality of the floor request sensor by software.

18. A device for communication in a multi-media dispatch network, comprising:
    a communications device, wherein the communications device includes a floor request sensor and wherein the floor request sensor sends a floor grant request message for a first media type in a multi-media dispatch communication session and a floor request message for a second media type in the multi-media dispatch communication session.

* * * * *